United States Patent Office 3,456,050
Patented July 15, 1969

3,456,050
DRAGÉE PREPARATION
Peter Rieckmann, Mannheim-Waldhof, and Heinz Schalk, Mannheim, Germany, assignors to C. F. Boehringer & Soehne G.m.b.H., Mannheim-Waldhof, Germany, a corporation of Germany
No Drawing. Filed Dec. 10, 1965, Ser. No. 513,103
Claims priority, application Germany, Jan. 13, 1965, B 80,090
Int. Cl. A61k 9/00
U.S. Cl. 424—35　　　　　　　　　　　　　3 Claims

ABSTRACT OF THE DISCLOSURE

Dragées consisting of an inner medicament-free confection or medicament-containing pharmaceutical drug pill center with an outer medicament-free sugar coating consisting of a dried homogeneous aqueous suspension containing 0.01–10 wt. percent of at least one fat or wax, 54–85 wt. percent of sugar and 5–20 wt. percent of solid fillers.

---

The present invention is concerned with a process for the manufacture of dragées. In one aspect it relates to an automatic process for rapidly manufacturing dragées. As used herein the term "dragée" is used in its dictionary sense, i.e., "anything sugar coated as a pill" (Funk & Wagnalls New Standard Dictionary of the English Language, page 756, 1942 Funk & Wagnalls Co. 1a: a sugar coated nut, b: a silver covered candy for decorating cakes, 2: a sugar coated medicated confection (Webster's Seventh New College Dictionary, page 251, 1963, G. & C. Merriam Co.

The dragée represents one of the most widely used forms in which pharmaceuticals are administered. Dragée preparations are easy to take and eliminate the unpleasant taste which is characteristic of so many preparations. Furthermore, the dragée is of especial importance for use in connection with materials which are sensitive to air, light, and moisture. Still further in the case of active materials which have an unpleasant effect on the stomach or which are inactivated in the stomach, it is possible to produce dragées using therefor special coatings which ensure that the dragées will first dissolve in the intestinal tract resulting in excellent tolerability and permitting the oral administration of drugs not possible in the absence of such coatings.

In recent years, the dragée has also found increasing favor in the confectionery industry in connection with the production of, for example, chewing gum and chocolate beans.

The manufacture of dragées by the usual production methods is a manual art which requires much practice, skill, and experience. The dragée center or core coming from the tabletting machine has applied thereto, where necessary, an insulating layer or layers which serve to protect the active materials from external influences. The core is then coated or covered, i.e., moistened with sugar syrups of definite construction and subsequently mixed with mixtures of talc, chalk, and like fillers. The process is repeated several times in order to put on the core as quickly as possible sufficient material to produce on the dragée edges which are rounded. However, the surface of the dragée obtained is not smooth, and a smooth surface must be provided in further steps using therefor sugar syrup and powdered sugar. The smoothing step is followed by coloring of the dragées, a uniform colored dragée being obtained only following the application of a large number of coats of colored sugar syrups. Finally, the dragées are waxed or polished.

The dragées are taken from the kettle used for their production between the individual working steps and dried in large drying machines or ovens so that the moisture necessary in connection with the coating applications cannot penetrate into the cores and damage the centers or cores. The process as described above necessitates a large amount of manual labor from skilled workers. The so-called "hand passage" is especially laborious; this consists in keeping the dragées moving by insertion of the hand into the kettle until the dragées no longer stick to one another or the kettle but circulate freely. Furthermore, this known process is extremely time-consuming. The dragées are required to be kept in circulation in the kettle for a total of about two days with additional time for periodic interruptions required for drying between each step in the process. In all, a total of eight to ten days are necessary for producing each batch of dragées.

Attempts have certainly already been made to carry out this old manual process mechanically by blowing a current of air up through the tablet cores and alternately spraying in sugar solutions and powdered substances (cf. U.S. patent specification No. 2,799,241). Quite apart from the fact that this dragée-making process cannot be carried out completely automatically, the necessary apparatus is also very expensive; the process cannot be carried out in the conventional dragée-making kettles.

In recent years, rapid dragée-making processes have also been described in connection with which it has been proposed that all of the materials to be applied to the dragées be combined in a single dragée-making suspension. Thus, for example, in German patent specification No. 1,000,569 (see also Awe, Deutsche Apotheker-Zeitung, 96, 1020–1024/1956) there is described a process in which a single emulsion consisting of water, sugar, starch, and sodium cellulose glycollate is applied to cores rotating in a dragée-making kettle at about 50° C., the coated cores then being dried at 30° C. for about half an hour and subsequently polished. However, this process only produces good results if the dragée-making is carried out under continuous supervision (cf. Gstirner, Grundstoffe und Verfahren der Arzenibereitung, pub. F. Enke, Stuttgart, 1960, page 61). The constant supervision required represents a considerable disadvantage over the above-described conventional dragée-making process in which the kettles do not have to be kept under constant supervision and observation.

Furthermore, the single suspension described by Awe must be used at an elevated temperature. It can, therefore, only be used in an automatic dragée-making device which has been provided with special means for maintaining an elevated temperature but this makes the process too expensive and uncertain.

The same disadvantages apply to the gelatine-containing sugar solutions described in German patent specification No. 1,079,280. The same can also only be employed at an elevated temperature and, in addition, the coated cores must be dusted with talc so that there is no advantage over the old manual process.

Other rapid dragée-making processes are based on the complete omission of the use of sugar, the dragée-making being carried out, for example, using alcoholic solutions of polyethylene glycols (cf. Gstirner, loc. cit., page 62, as well as German patent specification No. 1,158,481). As polyethylene glycols have an unpleasant taste, dragées produced in this manner are not pleasant to take and, therefore, do not fulfill, in a satisfactory manner, one of the main requirements of dragées. Furthermore, because of the danger of fire associated with the organic solvents employed, it is only possible to use these dragée-making suspensions in specially protected apparatus.

There has recently been described a dragée-making process in which the above-described disadvantages are avoided (U.S. patent applications Nos. 252,275 now issued to U.S. Patent 3,331,696 Rieckmann, Schalk and Theel; 331,638 now issued to U.S. Patent 3,395,213 Rieckmann, Schalk and Theel; 336,639 now abandoned). In U.S. application Ser. No. 252,275 and application Ser. No. 336,638, there are disclosed a process and suspensions for use therein for the fully automatic production of dragées, characterized in that the cores or centers are coated using an aqueous sugar coating suspension containing in addition to 40–50% by weight of sugar and 10–20% by weight of non-toxic and pharmaceutically acceptable fillers, 1–10% by weight of polyethylene glycols. The coating suspension is sprayed onto the cores maintained in rotation in a dragée-making kettle, the spraying is interrupted and dragée cores allowed to circulate for a certain period of time without external influence, and, thereafter, dried with a current of warm air. These three steps are repeated until the desired total amount of dragée-making suspension has been put onto the cores.

By addition of the polyethylene glycols to the sugar-containing dragée-making suspensions, the sticky stage in the drying of the suspensions is avoided. The dragées do not stick together and they do not adhere to the walls of the kettle. There is thus provided the prerequisite for a really fully automatic and rapid dragée-making process which has proved to be outstandingly successful in the pharmaceutical industry.

The process according to the above-mentioned U.S. application Ser. No. 252,275 is preferably carried out in the apparatus described in U.S. application Ser. No. 331,639, which comprises a spray device connected with a supply tank containing a dragée-making suspension, a source of warm air and a time switch device for controlling the spray device and said source of warm air. Thus, with the exception of the setting of the device at the beginning and end of the process, no manual labor is necessary and, furthermore, skilled workers are not necessary for supervising the process. In addition, drying cabinets or ovens are not required so that the laborious and frequent moving of the dragées from the kettle to the drying oven and back again to the kettle in the usual dragée-making process is rendered unnecessary.

The period for finishing one charge or batch of dragées by the process according to the above-mentioned U.S. application Ser. No. 252,275 is about one day and the capacity of the kettle is several times greater than in the case of the old process. Whereas previously the kettle filling was limited to that amount which could still be "hand passed," with the process described in U.S. application Ser. No. 252,275, the kettle can be filled to capacity.

Unfortunately, the above-mentioned process of U.S. application Ser. No. 252,275 cannot be used in the confectionery industry because in many countries, such as, for instance, Germany, polyethylene glycols are classified by the food laws and regulations, as foreign materials.

In the confectionery industry it has previously been conventional to use, for dragée-making, hot sugar solutions having the highest possible sugar concentrations in order that only a small amount of water has to be removed during the production of the dragées. A fully automatic dragée-making process based on the use of hot sugar solutions of this type would, in the first place, have associated these with the difficulty that the whole system would have to be thermostatically controlled; any cooling would lead to a drying up or crystallization of the sugar solution, whereby the equipment being used would be blocked up. The interruptions occasioned by such blockages would substantially completely negate the advantage of an automatic device over the manual process. Furthermore, the increased sugar concentrations present in the dragée-making solutions as used in the confectionery industry leads, of course, to a great extent, to the above-mentioned disadvantages of the sticking of the dragées in the kettle. In the previously used manual dragée-making process, this was prevented by sprinkling in powdered materials and also by the manual stirring up of the cores in the kettle. Of course, the use of an automatic dragée-making device would be pointless if it were still necessary to employ this manual work.

It is accordingly the general object of the present invention to provide a method for the manufacture of dragées which are of a purity, surface-smoothness, taste, and color suitable for commercial use in an economically feasible manner.

Still another object of the invention is to provide a substantially automatic and rapid method for the manufacture of dragées intended for use as a confectionery.

Still a further object of the invention is to provide coating suspensions for coating dragées, avoiding the use of materials such as polyethylene glycol not acceptable as ingredients of food products.

It is still another object of the invention to provide coating suspensions for coating dragées containing a wax and/or fat in addition to sugar, and filler material in aqueous suspension.

Other and further objects and advantages of the invention will become apparent to one skilled in the art upon referring to the accompanying disclosure.

In accordance with the present invention it has been surprisingly found that the above objects are accomplished and the above-mentioned disadvantages avoided when the centers or cores are coated using an aqueous sugar-containing suspension containing, in addition to 45–85% by weight of sugar and 5–20% by weight of solid fillers, 0.01–10% by weight of fat and/or wax.

In this way and namely by the incorporation according to the invention of a small amount of wax and/or fat in the sugar-containing coating suspension, the tendency to stickiness at the start of the drying of the suspension is overcome, that is, the dragées do not stick to one another nor do they adhere to the kettle wall. There is, as a result, made possible a rapid, fully automatic dragée preparation suitable for the confectionery industry.

In preparing the dragées, the coating suspension is sprayed onto the pills or centers maintained in rotation in a coating kettle, the spraying interrupted and the sprayed dragée centers maintained in rotation for a period of time and thereafter the coated centers dried with a current of warm air. These three steps in the sequence as set out are repeated, if necessary, until the desired total amount of coating suspension has been applied.

The aqueous sugar suspensions according to the present invention can be used cold so that they can be employed with the use of simple devices, without thermostatic control, as, for example, that described in U.S. application Ser. No. 331,639. In this way, there are obtained satisfactory sugar dragées in a substantially shorter period of time than with the old manual process (finishing time for one charge about one day), while saving the valuable manual work of skilled persons.

As noted above, in addition to the fats and/or waxes, the dragée-making suspensions according to the present invention also contain 45–85% by weight sugar and 5–20% by weight of the conventional fillers, such as starch, chalk gum arabic, kaolin, talc, alkaline earth metal phosphates, and titanium dioxide and mixtures thereof. If desired, there can also be admixed any of the permitted emulsifiers, such as lecithin and the alginates, in order to ensure a fine dispersion of the fats and/or waxes in the suspension. If the automatic dragée-making device according to the U.S. application Ser. No. 331,639 Rieckmann, Schalk and Theel is being employed, it is not necessary to use an emulsifier because the dragée-making suspension is, in this case, continuously circulated by a geared pump through a valve so that its homogeneity, especially during the period shortly before applications, is always ensured.

The coating suspensions of the invention per se are novel and can be produced very simply without heat merely by stirring the components together and homogenizing the resultant suspension, for example, in a corundum disk mill or the like. The solid fats and/or waxes are advantageously added in a molten state. It is possible in accordance with the invention to add coloring material from the start of the process if desired, thus achieving a uniform coloration of the dragées.

In Table 1, which follows, the illustrative examples of a number of dragée-making suspensions according to the present invention are set out.

EXAMPLE 1

22 kg. of chewing gum cores (length 21.1 mm., breadth 11.1 mm., height 5.2 mm., weight 1100 mg., number 20,000) were placed in a kettle having a diameter of 100 cm., which had been provided with a powerful exhaust system. The spray device was adjusted in such a manner that, per coating, about 170 ml. of the dragée-making suspension were sprayed onto the chewing gum cores within a period of 7 seconds. The cores were then allowed to circulate in the kettle for 1 minute without any external interference so that the suspension was uniformly distributed on the surfaces of the dragées. Drying was subsequently carried out for 2 minutes using therefor a current of air. These three steps (spraying, circulating, and drying) were repeated until 16 kg. of suspension had been applied. The pieces of chewing gum which have had smooth surfaces from the start of the process were now ready for waxing. The total production time amounted to 5.5 to 6 hours. During this time, no supervision of any kind was necessary. After the dragéeing had been completed, the individual pieces of chewing gum had a weight of 1900 mg.

TABLE 1.—COMPOSITION OF DRAGÉE SUSPENSIONS IN PERCENT

|  | 1 | 2 | 3 | 4 | 5 | 6 | 7 | 8 | 9 | 10 | 11 | 12 |
|---|---|---|---|---|---|---|---|---|---|---|---|---|
| Sucrose | 60 | 60 | 52 | 54.5 | 52 | 53 | 50 | 46 | 50 | 50 | 50 | 54 |
| Liquid glucose [1] |  |  | 2.5 |  |  | 2.5 | 3 | 2.5 | 2.5 | 2.4 | 3 | 2.5 |
| Starch |  | 9.5 |  |  | 7.5 | 7.5 |  |  |  | 5 |  | 6.5 |
| Chalk | 9.5 |  | 10 | 9 |  |  | 8 | 10 | 8 | 7 | 8 |  |
| Titanium dioxide |  |  | 2 | 1 |  |  | 2 | 2 | 2 |  | 2 |  |
| Palmitin | 0.5 | 0.5 | 0.9 | 0.4 |  |  |  |  |  |  | 0.9 |  |
| Cocoa Butter |  |  |  |  |  |  |  |  |  |  |  |  |
| Butter |  |  |  |  |  | 1.0 |  |  |  |  |  |  |
| Cream |  |  |  |  |  |  |  | 4 |  |  |  |  |
| Bees' wax |  |  |  |  |  |  |  |  | 1 |  |  |  |
| Parting wax |  |  |  |  | 0.4 |  | 1.8 |  |  |  |  | 0.9 |
| Olive oil |  |  |  |  |  |  |  |  |  | 0.5 |  |  |
| Lecithin |  |  |  |  |  | 1.0 | 0.2 | 0.5 | 0.5 |  |  |  |
| Sodium Alginate |  |  | 0.1 | 0.1 | 0.1 |  |  |  |  | 0.1 | 0.1 | 0.1 |
| Coloring | Q.S. | Q.S. | Q.S. | Q.S. | Q.S. | Q.S. | Q.S. | Q.S. | Q.S. | Q.S. | Q.S. | Q.S. |
| Water ad | 100 | 100 | 100 | 100 | 100 | 100 | 100 | 100 | 100 | 100 | 100 | 100 |

|  | 13 | 14 | 15 | 16 | 17 | 18 | 19 | 20 | 21 | 22 | 23 | 24 |
|---|---|---|---|---|---|---|---|---|---|---|---|---|
| Sucrose | 46.5 | 49 | 52.4 | 55 | 55 | 55 | 56 | 56 | 57.5 | 60 | 60 | 65 |
| Liquid glucose [1] | 2.5 | 2.5 | 2.5 | 3.5 | 5 | 3.5 | 3.5 | 4.5 | 2.5 | 5 | 3 | 2.5 |
| Starch |  |  |  |  | 9 | 6 | 12 | 10 |  |  |  |  |
| Chalk | 10 | 10 | 9 |  |  |  |  |  | 9 |  | 8 |  |
| Titanium dioxide | 2 | 2 | 1 |  |  | 2 |  |  |  |  |  |  |
| Palmitin | 3.4 | 1.4 | 5 | 0.5 | 1 | 0.3 |  | 0.5 |  |  | 2 |  |
| Margarine |  |  |  |  |  |  |  |  | 1 |  |  |  |
| Olive oil |  |  |  |  |  |  |  |  |  |  | 3 | 0.5 |
| Peppermint oil |  |  |  |  |  | 2 |  |  |  |  |  |  |
| Wax ("comprimatwachs") |  |  |  |  |  |  | 0.5 |  |  |  |  |  |
| Milk powder |  |  |  | 14 |  |  | 3 |  |  |  |  |  |
| Sodium alginate | 0.1 | 0.1 | 0.1 |  |  |  |  |  |  |  |  |  |

[1] The liquid glucose used is obtained by the hydrolysis of starch and contains glucose, maltose, and dextrines, together with about 20% water.
Q.S.—Quantum sufficit.

The following examples illustrate satisfactory procedures for the manufacture of dragées, but it is to be understood that they are presented only for the purpose of illustration and not as indicating the limits of the invention.

EXAMPLES 2–5

The process of Example 1 was repeated, the data and results of these coating operations as carried out in accordance with the process of the invention being set out in Table 2 following:

TABLE 2

| Type | Cores | | | | |
|---|---|---|---|---|---|
|  | Diam., mm. | Wt. (mg.) | Number | Total wt. (kg.) | Final wt. (mg.) |
| Balls | 6 | 80 | 100,000 | 8 | 130 |
| Dragées | 6 | 80 | 100,000 | 8 | 115 |
| Do | 10 | 330 | 120,000 | 39.6 | 500 |
| Drops | 9 | 360 | 120,000 | 43.2 | 560 |
| Chewing gum | [1] 21.1 [2] 11.1 [3] 5.2 | 1,100 | 20,000 | 22 | 1,900 |

[1] Length. [2] Breadth. [3] Height.

| 1st sprayed coating | | Kettle diam. (cm.) | Time per spray coating (sec.) | | | | Total dragée-ing time (hrs.) |
|---|---|---|---|---|---|---|---|
| Suspension (ml.) | Dry wt. (g.) |  | Spray (a) | Pause (b) | Drying (c) | a+b+c |  |
| 80 | 56 | 60 | 25 | 90 | 120 | 235 | 6.5–7 |
| 60 | 42 | 60 | 5 | 55 | 120 | 180 | 6.5–7 |
| 500 | 350 | 100 | 12 | 90 | 138 | 240 | 4 |
| 450 | 315 | 100 | 11 | 90 | 109 | 210 | 4 |
| 170 | 153 | 100 | 7 | 60 | 120 | 187 | 5.5–6 |

We claim:

1. A dragée, which will not stick to other dragées, nor adhere to the walls of dragée-making kettles, consisting of an inner medicament-free confection or medicament-containing pharmaceutical drug pill center with an outer medicamet-free sugar coating consisting of a dried homogeneous aqueous suspension of 45–85 weight percent of sugar, 5–20 weight percent of conventional solid fillers selected from thee group consisting of starch, gum arabic, chalk, kaolin, talc, titanium dioxide, alkaline earth metal phosphates, sodium alginate, coloring, and mixtures thereof, and from about 0.01 to about 10 weight percent of fats, waxes, and mixtures thereof, wherein said fats are selected from the group consisting of butter, cocoa butter, cream, lecithin margarine, milk powder, olive oil, and palmitin, and said waxes are selected from the group consisting of beeswax and parting wax.

2. An article of manufacture according to claim 1, wherein said encapsulating layer additionally contains coloring matter.

3. An article of manufacture according to claim 1, wherein said outer encapsulating layer comprises about 1½ to 2 times the weight of the center.

References Cited

UNITED STATES PATENTS

| | | | |
|---|---|---|---|
| 1,038,227 | 9/1912 | Sulzberger | 167—56 |
| 1,364,192 | 1/1921 | Friedman | 99—23 |
| 1,559,412 | 10/1925 | Franzen | 99—134 |
| 1,629,461 | 5/1927 | Berg et al. | 99—135 |
| 1,991,139 | 2/1935 | Clark | 167—56 |
| 2,262,087 | 11/1941 | Bartlett et al. | 167—82 |
| 2,367,166 | 1/1945 | Balston | 167—56 |
| 2,963,404 | 12/1960 | Hammer et al. | 167—82 |
| 3,140,229 | 7/1964 | Schultz et al. | 167—56 |
| 3,295,992 | 1/1967 | Frey | 99—134 |
| 3,331,696 | 7/1967 | Rieckmann et al. | 106—208 |

FOREIGN PATENTS

| | | |
|---|---|---|
| 968,441 | 9/1964 | Great Britain. |
| 968,442 | 9/1964 | Great Britain. |
| 968,443 | 9/1964 | Great Britain. |

LEWIS GOTTS, Primary Examiner

S. K. ROSE, Assistant Examiner

U.S. Cl. X.R.

99—134, 135, 138, 148, 166; 106—162, 243, 270, 271, 272; 117—100, 104, 105.3, 105.4, 165, 167, 168; 424—16, 38

PO-1050
(5/69)

UNITED STATES PATENT OFFICE
CERTIFICATE OF CORRECTION

Patent No. 3,456,050         Dated   July 15, 1969

Inventor(s)  Peter Rieckmann and Heinz Schalk

It is certified that error appears in the above-identified patent and that said Letters Patent are hereby corrected as shown below:

Col. 1, line 21, "54-85" should be -- 45-85 --.

Col. 2, line 46, "Arzenibereitung" should be --Arzneibereitung--.

Col. 7, line 6 "medicamet-free" should be --medicament-free--.

line 9, "thee" should be -- the --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents